(12) United States Patent
Gubbels

(10) Patent No.: US 6,374,623 B1
(45) Date of Patent: Apr. 23, 2002

(54) STABLE PROVIDING WITH A CLIMATE CONTROL SYSTEM, AND ALSO A METHOD FOR CONTROLLING THE CLIMATE IN SUCH A STABLE

(75) Inventor: Henricus Anthonius Gubbels, Helmond (NL)

(73) Assignee: Bokalan B.V./Richard Kusters, Nuenen (NL)

( * ) Notice: Subject to any disclaimer, the term of this patent is extended or adjusted under 35 U.S.C. 154(b) by 0 days.

(21) Appl. No.: 09/575,328

(22) Filed: May 19, 2000

Related U.S. Application Data

(63) Continuation of application No. PCT/NL98/00665, filed on Nov. 19, 1998.

(30) Foreign Application Priority Data

Nov. 19, 1997 (NL) .............................................. 1007583

(51) Int. Cl.⁷ .......................... F25B 49/00; F25D 17/04
(52) U.S. Cl. ..................................... 62/176.6; 62/324.1
(58) Field of Search ......................... 62/176.6, 97, 126, 62/324.1, 180; 454/238; 236/49.3, 338; 165/224, 229, 200; 222/1

(56) References Cited

U.S. PATENT DOCUMENTS

| | | | | |
|---|---|---|---|---|
| 3,585,809 A | * | 6/1971 | Brown ........................ | 62/126 |
| 3,913,344 A | * | 10/1975 | Holloway et al. ......... | 62/176.6 |
| 3,979,922 A | * | 9/1976 | Shavit ........................... | 62/97 |
| 4,043,256 A | * | 8/1977 | Van Huis .................... | 454/238 |
| 4,241,871 A | * | 12/1980 | Newell, III et al. ....... | 236/49.3 |
| 4,567,939 A | * | 2/1986 | Dumbeck ................... | 165/224 |
| 4,598,558 A | * | 7/1986 | Bingham ................... | 62/324.1 |
| 4,603,556 A | * | 8/1986 | Suefuji et al. ............. | 62/180 |
| 4,862,950 A | * | 9/1989 | Gribble et al. ............ | 165/229 |
| 5,115,942 A | * | 5/1992 | Merrill et al. .............. | 222/1 |
| 5,215,498 A | | 6/1993 | Wong et al. | |
| 5,394,934 A | * | 3/1995 | Rein et al. ................. | 165/200 |
| 5,860,857 A | * | 1/1999 | Wasastjerna et al. ...... | 454/338 |

FOREIGN PATENT DOCUMENTS

| | | |
|---|---|---|
| DE | 3131655 | 2/1983 |
| DE | 4013518 | 8/1991 |
| DE | 4127179 | 2/1993 |
| EP | 1408880 | 10/1975 |
| JP | 1007583 | 1/1989 |
| NL | 1007583 | 11/1977 |
| NL | 8002341 | 11/1981 |
| NL | 1007583 | 1/1996 |
| WO | WO 8000486 | 3/1980 |

\* cited by examiner

*Primary Examiner*—Teresa Walberg
*Assistant Examiner*—L Fastovsky
(74) *Attorney, Agent, or Firm*—Hovey Williams LLP

(57) ABSTRACT

The invention relates to a stable comprising a floor, upright walls bounding said floor, in which walls one or more fans are present, and a roof covering a space bounded by said floor and said walls, in which roof means for exhausting spent air are present, which spent air is used for controlling the temperature of the air to be supplied, wherein said fans supply conditioned air essentially at floor level, wherein the amount of air to be supplied and the temperature thereof can be controlled for each fan individually.

20 Claims, 1 Drawing Sheet

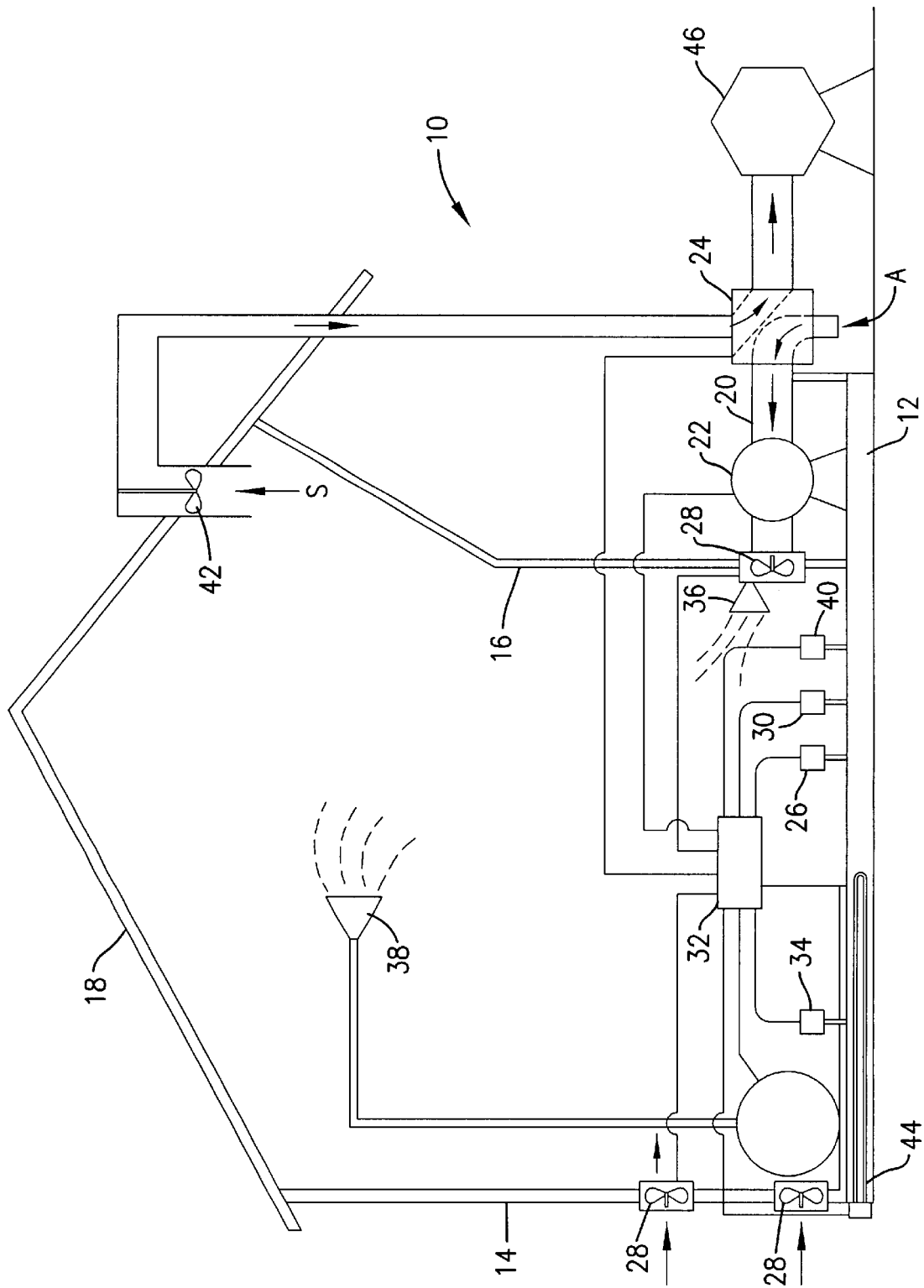

US 6,374,623 B1

STABLE PROVIDING WITH A CLIMATE CONTROL SYSTEM, AND ALSO A METHOD FOR CONTROLLING THE CLIMATE IN SUCH A STABLE

RELATED APPLICATION

This application is a continuation of co-pending application PCT/NL98/00665, filed Nov. 19, 1998, which claims the benefit of NL App. 1007583, filed Nov. 19, 1997.

BACKGROUND OF THE INVENTION

1. Field of the Invention

The present invention relates to a stable comprising a floor, upright walls bounding said floor, in which walls one or more fans are present, and a roof covering a space bounded by said floor and said walls, in which roof means for exhausting spent air are present, wherein said spent air is used for controlling the temperature of the air to be supplied. The present invention furthermore relates to a method for controlling the climate in such a stable.

2. Description of the Prior Art

From Netherlands Patent Application 8002341, which is laid open to public inspection, a similar method is known for controlling climatological aspects in a work space. An air guidance system is mounted in the uppermost part of a work space, via which system fresh air is transported from the rear side wall to the front side wall. The air guidance system is furthermore provided along the whole length of the side wall with a tubular element, in which outlet openings are provided. One drawback of using such a system in a work space is the fact that the amount of air flowing from said outlet openings and the temperature thereof are the same at every position in said work space. Thus, precise control or metering of the amount of air and control of the temperature thereof at any position in the work space is not possible, which can be considered to be a drawback, especially from the points of view of health and economy.

Such a stable is also known from Dutch patent No. 1000001, which stable is provided with ventilating means, which are capable of drawing in outside air, and which can be driven in an oscillating manner by driving means, such that an air flow is effected over part of the floor. The spent air that is produced in the stable is exhausted to the outside air without any after-treatment. According to said Dutch patent, ventilation of the animals which are present in the stable takes place with fresh outside air, which would lead to a significant improvement as regards the well-being of the animals, since odour and heat are quickly discharged from the animals' surroundings, thus giving them ma sense of cooling rather than of heat. Thus, the number of animals dying due to accumulation of harmful gases and heat could be reduced considerably. From practice it has become apparent, however, that the well being of said animals has improved insufficiently, because the outside air being supplied in cold weather conditions causes illness among the animals. Besides, the energy consumption is high in such a stable, since there is no re-use of useful spent flows. In addition, the emission of ammonia is high, due to the presence of the manure on the stable floor. According to said Dutch patent, the harmful emission of ammonia is indeed slightly reduced by supplying cold outside air, but a drawback of using such cold outside air is the fact that it causes illness among the animals, which is undesirable.

From German Offenlegungsschrift DE-A-3131655 a method and a device for a climate control system are furthermore known, wherein the fresh outside air is passed through a heat exchanger, which is fed with stable air, in order to raise the temperature of said outside air. In addition to that, an amount of heated outside air is passed through a second heat exchanger and discharged to the stable floor. One drawback of such a climate control system is the fact that neither the amount of the air to be supplied to the stable nor the temperature thereof can be controlled in dependence on the presence of animals at a particular location in the stable. Consequently, such a robust climate control system will not be suitable for intensive rearing farms, for example poultry rearing farms, because of the temperature sensitivity of the animals and their susceptibility to illness, in particular due to draught.

SUMMARY OF THE INVENTION

The objective of the present invention is to construct a stable in such a manner that a significant saving on energy costs can be realised.

Another objective of the present invention is to construct a stable in such a manner that the emission of ammonia is minimized.

Another objective of the present invention is to provide a climate control system for a stable, which system provides favourable living conditions for the animals.

Another objection of the present invention is to provide a method and a device which make it possible to create climatologically favourable conditions at any location, independently of the conditions at other locations.

The present invention as referred to in the introduction is characterized in that said fan supply conditioned air essentially at stable floor level, wherein the amount of air to be supplied and the temperature thereof can be controlled for each fan individually.

The term "essentially at stable floor level" must be understood to mean the height of the animals, which height will be less than 1.5 m in practice. The air is supplied for the purpose of optimizing the living conditions of the animals, so that it is desirable to supply air to the location where the animals are present, that is, on the stable floor. In practice the animals, for example chickens, will scatter at random over the floor. It happens frequently, however, that all the animals gather in a particular part of the stable, for example as a result of a shock reaction. This means that the production of $CO_2$ and heat will be high at that part of the stable, which harmful effects are overcome by the present invention, since the amount of the air to be supplied and the temperature thereof can be controlled for each fan individually. After all, there is no need to supply air to a part of the stable where no animals are present. Thus, the fan will supply a sufficient amount of cold air at the location where there is a high concentration of animals.

As a result of the presence of the animals on the stable floor, the energy content of the spent air is such that said energy can be used advantageously for controlling the temperature of the air to be supplied to the stable floor. The term "for each fan individually" is to be understood to include the embodiment wherein a number of fans disposed side by side are driven simultaneously, for example. In other words, the present invention makes it possible to set climatologically independent conditions in particular parts of the stable, so that zones are created which can be controlled independently of each other.

Although it is known from Dutch patent NO. 1000001 to have the control of the ventilating means take place in an automated manner, taking into account the inside temperature, the outside temperature and other parameters which are essential for conditioning purposes, for example, it is not known from said Dutch patent to use the spent air for controlling the temperature of the air to be supplied to the stable floor.

BRIEF DESCRIPTION OF THE DRAWING

The FIGURE is a schematic representation of a stable in accordance with the present invention.

DESCRIPTION OF THE PREFERRED EMBODIMENTS

According to the present invention, the temperature of the air to be supplied to a stable 10 having a floor 12, upright walls 14 and 16, and roof 18 can be adjusted by means of a heating element 20, for example a heating boiler 22 or a heat pump 24, which heating element 20 is connected to the spent air S. The wall 16 includes a sloping section but, in actual practice, wall 16 will typically be entirely vertical. The function of the heat pump 24 is to reuse the energy which is present in the spent air in a advantageous manner, in particular for the purpose of controlling the temperature of the air to be supplied. When such a heat pump is used, it is possible to influence the temperature of the air to be supplied. In a cold weather situation it is desirable to raise the temperature of the cold outside air to the desired value, whilst in a hot weather situation it is desirable to cool the relatively hot outside air before it is supplied to the stable floor 12. The heat pump is constructed in such a manner that no mixing of fresh outside air A and spent air S will take place. The spent air functions as a useful energy source for controlling the temperature of the air to be supplied to the stable. It should be apparent, however, that during the starting phase the temperature is controlled by means of a heating boiler 22. Once the temperature of the spent air is high enough, the control of the temperature will gradually be taken over by the heat pump 24. It should be apparent, however, that the control of the temperature of the air to be supplied can take place by means of a heating boiler 22 and/or a heat pump 24. The heating boiler/heat pump combination will be used when the amount of energy which is supplied by the heat pump is insufficient for reaching the desired final temperature. Furthermore, in many cases a heating boiler will be used in already existing stables for "support".

Temperature measuring sensors 26 are present at a stable floor level for the purpose of being able to control the temperature in an advantageous manner. Said sensors 26 are connected to the heat pump 24, so that information relating to the prevailing temperature at the stable floor is sent to the heat pump 24 and/or to the heating boiler 22, and the desired temperature is adjusted.

A plurality of fans 28 in the walls 14 and 16 supply conditioned air into the stable essentially at stable floor level. The amount of the air to be supplied and the temperature thereof are controlled for each fan 28 individually. In the schematic drawing, only one of the fans 28 is shown as being coupled with the heating element 20, but it will be understood by those skilled in the art that conditioned air may be directed to all of the fans 28 via a common heating element with appropriate ducting and valving, or via an individual heating element and duct for each individual fan. Regardless, automated control unit 32 handles information processing and control for all fans and every heating element.

Preferably, sensors 30 for measuring the $CO_2$ level are present at stable floor level, which sensors are connected to the fans 28 for controlling the amount of air to be supplied. If a large number of animals are present on the stable floor, the air breathed by said animals will cause the $CO_2$ level to rise. If the $CO_2$ level rises beyond a predetermined value, the sensors 30 will send this information to the fans 28, as a result of which the amount of conditioned air being supplied essentially at floor level will be increased, so that the $CO_2$ level will decrease. By using such a control method, it is ensured that ideal living conditions are created for the animals at every stable floor position. Thus, controlling the $CO_2$ level is in fact the same as controlling the $O_2$ level. In practice, precise measuring of the $O_2$ level is difficult, so that it is preferred to measure the $O_2$ level indirectly via the prevailing $CO_2$ level.

In a preferred embodiment of the stable according to the present invention, the temperature sensors and the $CO_2$ level sensors are connected to the heat pump and to the fans via an automated control unit 32. An automated control unit 32 provides direct and precise processing of the information obtained from the sensors, thus ensuring stable living conditions at stable floor level. It is also possible, however, to control the fans 28 and the heat pump 24 by analog means, but from a viewpoint of business economics it is preferred to control the fans and the heat pump via an automated control unit.

Not only the oxygen concentration and the temperature have an effect on the well-being of the animals, but also the relative humidity of the air and the ammonia content thereof. Consequently, it is preferred to mount sensors 34 for measuring the relative humidity essentially at stable floor level. Such sensors 34 provide information on the relative humidity that prevails on the stable floor, and if said value is too low, the humidity of the conditioned air to be supplied will have to be raised until the desired value is reached. The raising of the relative humidity level can take place by means of an atomizing unit 36 present in the fan, or an atomizing element 38 which is disposed above the stable floor.

Furthermore, it is preferred to mount one or more sensors 40 for measuring the ammonia level essentially at stable floor level. If the ammonia level exceeds the desired value, the amount of air to be supplied via the fans 28 will be increased. It is also possible, however, to cool the stable floor in such a situation, or to use a combination of the two measures.

The spent air S, which is to be understood to mean the air which is present in the stable, is discharged to the heat pump under a slight overpressure. Said slight overpressure in the stable is caused by supplying conditioned air via the fans 28. The overpressure thus generated provides the driving force for transporting the spent air from the stable to the heat pump.

In a preferred embodiment of the present stable, however, it is preferred to effect the discharge of the spent air S from the stable to the heat pump by means of a so-called assister fan 42. The use of such a fan 42 enables a precise adjustment of the spent air to be supplied to the heat pump, which has a positive effect on the efficiency of the heat pump.

In a preferred embodiment of the stable according to the present invention, the stable floor is provided with heating and cooling elements 44, whereby the temperature of the stable floor can be adjusted independently of the temperature of the air to be supplied via the fans.

If the present stable is used for rearing chicks, it is preferred to heat the stable floor during the initial stage of the rearing period. After some time, the amount of manure which is present on the stable floor will increase, so that a slightly warm under-layer is formed for the animals. One drawback of the presence of said warm under-layer is the fact that it leads to an increased emission of ammonia from the manure. Said emission of ammonia from the manure can then be minimized in an advantageous manner by gradually reducing the temperature of the floor. Said reduction of the floor temperature takes place by connecting the cooling elements which are present in or under the floor. The changeover from heating to cooling is generally carried out by replacing the hot water in the pipes by cold water.

The spent air being discharged from the stable contains a number of undesirable components, such as dust and ammonia. Although the spent air can be can be exhausted to the outside air directly after being supplied to the heat pump, it is preferred according to the present invention to supply the spent air that exits from the heat pump to a washing unit 46. Such a washing unit 46 ensures that the undesirable components, in particular dust and ammonia, are trapped and that an air flow is obtained which can be exhausted to the outside air without any problems. Said air flow, which is subjected to an after-treatment in the washing unit, can subsequently be discharged in an ecologically sound manner.

The present invention furthermore relates to a method for controlling the climate in a stable, in particular a stable according to any one of the present claims, with the method according to the present invention being characterized in that fresh outside air is conditioned by means of a heat pump, possibly in combination with a heating boiler, that the conditioned air is supplied via fans, essentially at stable floor level, after which the spent air is withdrawn from the stable 10 and fed to the heat pump, which fans 28 can be controlled independently of each other as regards the amount of air to be supplied and the temperature thereof.

According to such a method for controlling the climate in a stable, the energy contained in the spent air is re-used in an advantageous manner. In addition, conditioned air is only supplied where it is actually needed, namely essentially at stable floor level. In addition to that, individual control of each fan makes it possible according to the present invention to adjust the desired living conditions for the animals at every position of the stable floor. According to such a method, the amount of air to be supplied is reduced by 50–80% in comparison with a climate control system according to the prior art, and the energy consumption is reduced by 60–70%.

In a preferred embodiment of the method according to the present invention, the temperature of the air to be conditioned is controlled by means of one or more temperature sensors, which mounted essentially at stable floor level.

The amount of air to be supplied to the stable floor is preferably controlled by means of one or more sensors for measuring the $CO_2$ level, which are present on the stable floor. The $CO_2$ level is used as a parameter of the air concentration, whereby an excessive $CO_2$ level is an indication for increasing the amount of air to be supplied to the stable floor. In addition to that it is preferred to control the amount of air to be supplied by means of one or more $NH_3$ sensors. An excessive $NH_3$ level is experienced as unpleasant by the animals, and an increase of the supplied amount of air will lower the $NH_3$ level.

The spent air which exits from the heat pump is preferably supplied to a washing unit before being exhausted to the outside air, in which washing unit undesirable components such as dust and ammonia are trapped.

Furthermore, it is preferred to adjust the temperature of the stable floor so that the $NH_3$ emission is minimized. In practice, this means that the floor will be heated during the initial stage of a rearing period of chicks, for example, so as to create favourable living conditions for the animals to be reared. After some time, the heat production of the animals will increase, as a result of which the ideal temperature conditions on the stable floor will be exceeded, which means that the stable floor will have to be cooled. In addition, a high floor temperature leads to the emission of $NH_3$ which is undesirable. It is also possible, however, to influence the temperature conditions on the stable floor by supplying cold air in larger amounts via the fans. In practice, however, such a measure often causes illness, which is undesirable. Consequently it is preferred to cool the stable floor in such a manner that the emission of $NH_3$ is minimized, whereby at the same time the temperature conditions on the floor are favourably influenced by the temperature of the air to be supplied. By maintaining a relatively cold floor it is ensured that the emission of ammonia from the manure is minimized.

What is claimed is:

1. A stable comprising a floor, upright walls bounding said floor, which walls are provided with air supply means, and a roof covering a space bounded by said floor and said walls, in which roof means for exhausting spent air are present, wherein said spent air is used for controlling the temperature of the air to be supplied, and including several fans which supply conditioned air essentially at stable floor level, wherein the amount of air to be supplied and the temperature thereof can be controlled for each fan individually.

2. A stable according to claim 1, including a heat pump, wherein the temperature of the air to be supplied can be adjusted by means of the heat pump, which heat pump is connected to the spent air.

3. A stable according to claim 2, including temperature measuring sensors which are present at stable floor level, which sensors are connected to said heat pump.

4. A stable according to claim 1, including sensors for measuring the $CO_2$ level which are present at stable floor level, which sensors are connected to said fans.

5. A stable according to claim 1, including an atomizing unit and sensors for measuring the relative humidity which are present at stable floor level, which sensors are connected to the atomizing unit.

6. A stable according to claim 5, wherein said atomizing unit is present in the fan.

7. A stable according to claim 5, wherein said atomizing unit is disposed above the stable floor.

8. A stable according to claim 1, including sensors for measuring the $NH_3$ level which are present at stable floor level, which sensors are connected to said fans.

9. A stable according to claim 8, including a heat pump, temperature measuring sensors positioned at the stable floor level and operatively connected to said heat pump, sensors for measuring the $CO_2$ level positioned at the stable floor level which are connected to said fans, and wherein said temperature sensors, said $NH_3$ sensors and said $CO_2$ sensors are connected to said heat pump and said fans via an automated control unit.

10. A stable according to claim 2, wherein the spent air is discharged to said heat pump under a slight overpressure.

11. A stable according to claim 2, including an assister fan provided for discharging the spent air to said heat pump.

12. A stable according to claim 1, wherein the stable floor is provided with heating and cooling elements.

13. A stable according to claim 12, wherein the temperature of the stable floor can be adjusted independently of the temperature of the air to be supplied.

14. A stable according to claim 1, including a washing unit, wherein the spent air existing from said heat pump is connected to said washing unit.

15. A method for controlling the climate in a stable as set forth in claim 1 and including a heat pump, comprising the steps of conditioning fresh outside air by means of a heat pump, supplying the conditioned air to said stable via several fans, essentially at stable floor level, thereafter withdrawing the spent air from the stable, and feeding the spent air to a heat pump in order to recover the energy present in the spent air, wherein the amount of air to be supplied and the temperature thereof can be controlled for each fan.

16. A method according to claim 15, including the step of controlling the temperature of the air to be supplied, which is to be conditioned, by means of one or more temperature sensors, which are mounted at stable floor level.

17. A method according to claim 15, including the step of controlling the amount of air to be supplied essentially at stable floor level by means of one or more sensors for measuring the $NH_3$ level and/or the $CO_2$ level, which are present substantially at stable floor level.

18. A method according to claim 15, including the step of supplying the spent air which exists from the heat pump to a washing unit.

19. A method according to claim 15, including the step of adjusting the temperature of the stable floor so that the emission of $NH_3$ from the manure is minimized.

20. A method according to claim 15, including the step of controlling the relative humidity essentially at stable floor level by means of one or more sensors for measuring the relative humidity, which sensors are connected to an atomizing unit.

* * * * *